(12) United States Patent
Adler et al.

(10) Patent No.: US 8,891,680 B2
(45) Date of Patent: Nov. 18, 2014

(54) TRANSMISSION ARRANGEMENT AND METHOD FOR MODULATING USEFUL SIGNALS ONTO A CARRIER FREQUENCY SIGNAL

(75) Inventors: Bernd Adler, Neubiberg (DE); Andre Hanke, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 545 days.

(21) Appl. No.: 12/830,551

(22) Filed: Jul. 6, 2010

(65) Prior Publication Data

US 2011/0007842 A1   Jan. 13, 2011

(51) Int. Cl.
*H03C 3/00* (2006.01)
*H04L 27/28* (2006.01)
*H04L 27/36* (2006.01)

(52) U.S. Cl.
CPC .............. *H04L 27/362* (2013.01); *H04L 27/28* (2013.01)
USPC ........... 375/302; 375/300; 375/308; 375/298; 375/297

(58) Field of Classification Search
USPC .......................... 375/302, 298, 297, 300, 308
See application file for complete search history.

(56) References Cited

U.S. PATENT DOCUMENTS

| 7,684,763 | B2 | 3/2010 | Boos | |
|---|---|---|---|---|
| 2008/0205549 | A1* | 8/2008 | Rofougaran | 375/299 |
| 2009/0302963 | A1* | 12/2009 | Ballantyne et al. | 332/105 |
| 2009/0311980 | A1* | 12/2009 | Sjoland | 455/127.3 |

OTHER PUBLICATIONS

A robust GSM/EDGE Transmitter Using Polar Modulation Techniques, Mayer et al., European Microwave Week (EUMW) 2005, Paris, France, Oct. 2005, Four (4) pages.

* cited by examiner

*Primary Examiner* — Kabir A Timory
(74) *Attorney, Agent, or Firm* — Schwegman Lundberg & Woessner, P.A.

(57) ABSTRACT

A transmission arrangement for modulating useful signals onto a carrier frequency signal has a frequency generator for generating the carrier frequency signal, a first modulation path for modulating a first useful signal onto the carrier frequency signal, and a second modulation path for modulating a second useful signal onto the carrier frequency signal. The first modulation path has a digital modulator for providing an amplitude signal and a Cartesian signal pair from the first useful signal and a Cartesian modulator for modulating the Cartesian signal pair onto the carrier frequency signal in order to provide an intermediate signal. The first modulation path is configured in such a manner that the amplitude signal is modulated onto the intermediate signal in order to provide an output signal.

9 Claims, 3 Drawing Sheets

TRANSMISSION ARRANGEMENT AND METHOD FOR MODULATING USEFUL SIGNALS ONTO A CARRIER FREQUENCY SIGNAL

This Application claims priority to German Patent Application No.: 102009032049.0, which was filed on Jul. 7, 2009. The entire contents of the German Application are hereby incorporated herein by reference.

BACKGROUND

In communication systems, it is generally desirable to transmit a useful signal, which contains an item of information to be transmitted, at the highest possible data rate. A high data rate can be achieved, for example, by a wide bandwidth in the transmission channel. For example, a wide bandwidth and thus a high data rate will be achieved in a radio communication system by transmitting in a wide frequency band. However, the frequency band used is not available to other users as a result. The aim is therefore to increase the efficiency of a communication system. In this case, the efficiency results from the ratio of the data rate to the bandwidth used by the communication system. In a digital radio system, this is represented, for example, by the spectral efficiency which can be stated using the variable of bits transmitted per second per hertz of bandwidth used.

Different methods can be used to increase the efficiency. So-called MIMO (Multiple Input Multiple Output) techniques are often used in mobile radio systems, for example in mobile telephones or WLAN systems. A plurality of transmitting and receiving antennas for wireless communication are used for this purpose. A transmission arrangement thus comprises a plurality of transmitting antennas.

A plurality of transmitting antennas are often also provided in a transmission arrangement for other reasons. For example, the same useful signal is fed into a communication channel via a plurality of antennas by means of so-called transmit diversity. This makes it possible, for example, to counteract effects such as fading caused by multipath propagation.

The provision of two or more transmitting antennas generally requires the provision of two or more parallel transmission paths. However, it is problematic in this case that, when two transmission paths are arranged in an electronic component, there may be crosstalk of a radio-frequency signal in one transmission path to a second transmission path, and the signal processing in the second transmission path is either more complicated or is of reduced quality as a result.

SUMMARY

The present invention is based on the problem of providing a transmission arrangement and a method for transmitting useful signals which have been modulated onto a carrier frequency signal, which method makes it possible to provide two or more parallel transmission paths in an electronic component with good signal processing in parallel transmission paths.

The present problem is solved by a transmission arrangement and a method having the features of the independent patent claims.

In this case, the transmission arrangement for modulating useful signals onto a carrier frequency signal has a frequency generator for generating the carrier frequency signal, a first modulation path for modulating a first useful signal onto the carrier frequency signal, and a second modulation path for modulating a second useful signal onto the carrier frequency signal. The first modulation path has a digital modulator for providing an amplitude signal and a Cartesian signal pair from the first useful signal and a Cartesian modulator for modulating the Cartesian signal pair onto the carrier frequency signal in order to provide an intermediate signal. The first modulation path is configured in such a manner that the amplitude signal is modulated onto the intermediate signal in order to provide an output signal.

The method for modulating useful signals onto a carrier frequency signal has the following steps of:
generating the carrier frequency signal;
providing an amplitude signal and a Cartesian signal pair from a first useful signal;
modulating the Cartesian signal pair onto the carrier frequency signal in order to provide an intermediate signal;
modulating the amplitude signal onto the intermediate signal in order to provide a first output signal.

The basic idea of the invention is to provide a common frequency generator for generating the carrier frequency signal. The first modulation path uses the principle of a polar modulator in which separate phase modulation and amplitude modulation are carried out. The phase modulation is carried out in a Cartesian modulator. In this case, it is advantageously possible to use Cartesian modulators, that is to say quadrature modulators, to modulate signals having a constant envelope. In another advantageous refinement, these can also be configured using digital signal processing. Amplitude modulation has considerable advantages since the constant envelope of the intermediate signal means that it is also possible to use non-linear power amplifiers, for example power amplifiers whose power also varies, in the downstream signal chain.

Another advantage is that the parallel transmission paths can be controlled independently of one another. This is particularly advantageous since two antenna connections may require different matching operations, for example because different VSWRs exist as a result of a differently perceived environment.

The technology shown furthermore makes it possible to also provide an amplitude difference in addition to a phase difference. This makes it possible to optimize power and thus increase the system performance, for example.

Developments and refinements of the present inventions are specified in the dependent patent claims.

BRIEF DESCRIPTION OF THE DRAWINGS

Embodiments of the invention are explained below with reference to the accompanying drawings, in which.

DESCRIPTION

Figure 1:
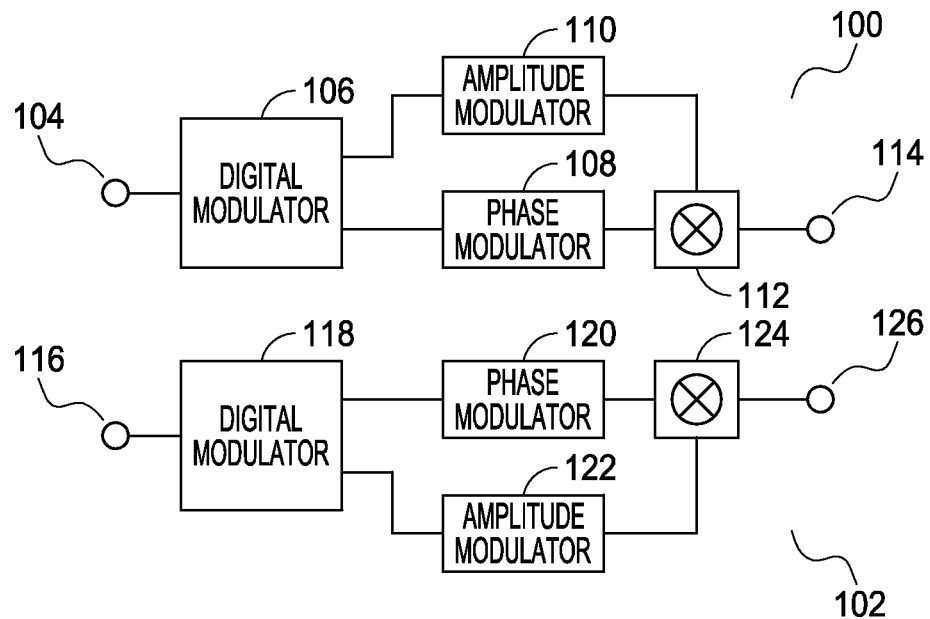
FIG. 1 shows a transmission arrangement having two parallel transmission paths.

FIG. 1 shows a transmission arrangement having a first transmission path 100 and a second transmission path 102. Both the first transmission path 100 and the second transmission path 102 are each modulation paths for modulating a useful signal onto a carrier frequency signal. A first useful signal is modulated onto a first carrier frequency signal in the first transmission path 100. A second useful signal is modulated onto a second carrier frequency signal in the second transmission path 102. The first useful signal and the second useful signal each comprise information which is intended to be transmitted by the transmission arrangement. The first useful signal and the second useful signal are provided by an apparatus (not illustrated here), for example a baseband-processing unit. The information to be transmitted may comprise audio and/or video information, for example. If the first useful signal comprises the same information as the second useful signal, the transmission arrangement is designed for transmit diversity. However, the first useful signal may also comprise information which differs from that in the second useful signal. In this case, the transmission arrangement is designed for space-time diversity.

The first transmission path 100 has a first input 104 via which the first useful signal is supplied. The first input 104 is connected to a first digital modulator 106. A first amplitude information signal and a first phase information signal are generated from the first useful signal in the first digital modulator 106. In this case, the first useful signal is modulated according to a modulation scheme and is represented using polar coordinates. Modulation schemes such as PSK (Phase Shift Keying) or QAM (Quadrature Amplitude Modulation) which use both phase modulation and amplitude modulation are often used in this case in mobile radio but also in wired communication systems. The first digital modulator 106 can also perform further functions, for example digital modulation of the useful data and/or pulse-shaping of the first amplitude information signal and of the first phase information signal.

The first digital modulator 106 is connected to a first phase modulator 108 and to a first amplitude modulator 110. In this case, the first digital modulator 106 supplies the first phase information signal to the first phase modulator 108. The first phase modulator 108 modulates a first carrier frequency signal with the first phase information signal to form a first modulated phase information signal. The first phase information signal is an intermediate signal which is then modulated with an item of amplitude information.

The first phase modulator 108 may comprise a frequency generator which generates a signal at a first carrier frequency of the first carrier frequency signal. In this case, the phase of the intermediate signal generated is controlled by the first phase information signal. The intermediate signal generated corresponds to the first modulated phase information signal. The first frequency generator is in the form of a phase locked loop (PLL) or an oscillator which is controlled or regulated in some other manner, for example.

The first digital modulator 106 supplies the first amplitude information signal to the first amplitude modulator 110. The first amplitude modulator 110 is set up to perform functions such as a propagation time delay, filtering of the first amplitude information signal and conversion into a first analog amplitude information signal. In addition, a further item of amplitude information, for example for running up the power or adapting the output power in some other manner, can be applied to the first amplitude information signal. This can take place in the digital and analog domains of the first amplitude modulator 110. The first amplitude modulator 110 generates a first modulated amplitude information signal from the first amplitude information signal.

The first amplitude modulator 110 is connected to the first input of a first mixing element 112. The first phase modulator 108 is connected to a second input of the first mixing element 112. The first mixing element 112 applies the first modulated amplitude information signal to the first modulated phase information signal. For this purpose, the first mixing element 112 may comprise a mixer or a multiplier. The first mixing element 112 provides, at a first signal output 114, a first output signal which now comprises modulation of the first useful signal onto a first carrier frequency signal.

The second transmission path 102 has a second input 116 via which the second useful signal is supplied. The second input 116 is connected to a second digital modulator 118. A second amplitude information signal and a second phase information signal are generated from the second useful signal in the second digital modulator 118. In this case, the second digital modulator is configured in a similar manner to the first digital modulator 106 and performs the same functions as the first digital modulator 106.

The second digital modulator 118 is connected to a second phase modulator 120 and to an amplitude modulator 122. In this case, the second digital modulator 118 supplies the second phase information signal to the second phase modulator 120. The second phase modulator 120 modulates a second carrier frequency signal with the second phase information signal to form a second modulated phase information signal. The second phase information signal is an intermediate signal which is then modulated with an item of amplitude information.

The second phase modulator 120 is constructed in an identical manner to the first phase modulator 108. It comprises its own second frequency generator for generating the second carrier frequency signal.

The second digital modulator 118 supplies the second amplitude information signal to the second amplitude modulator 122. The second amplitude modulator 122 is constructed in an identical manner to the first amplitude modulator 110 and generates a second modulated amplitude information signal from the second amplitude information signal.

The second amplitude modulator 122 is connected to the first input of a second mixing element 124. The second phase modulator 120 is connected to a second input of the second mixing element 124. The second mixing element 124 applies the second modulated amplitude information signal to the second modulated phase information signal. It is constructed in an identical manner to the first mixing element 112. The second mixing element 124 provides, at a second signal output 126, a second output signal which now comprises modulation of the second useful signal onto a second carrier frequency signal.

Figure 2:
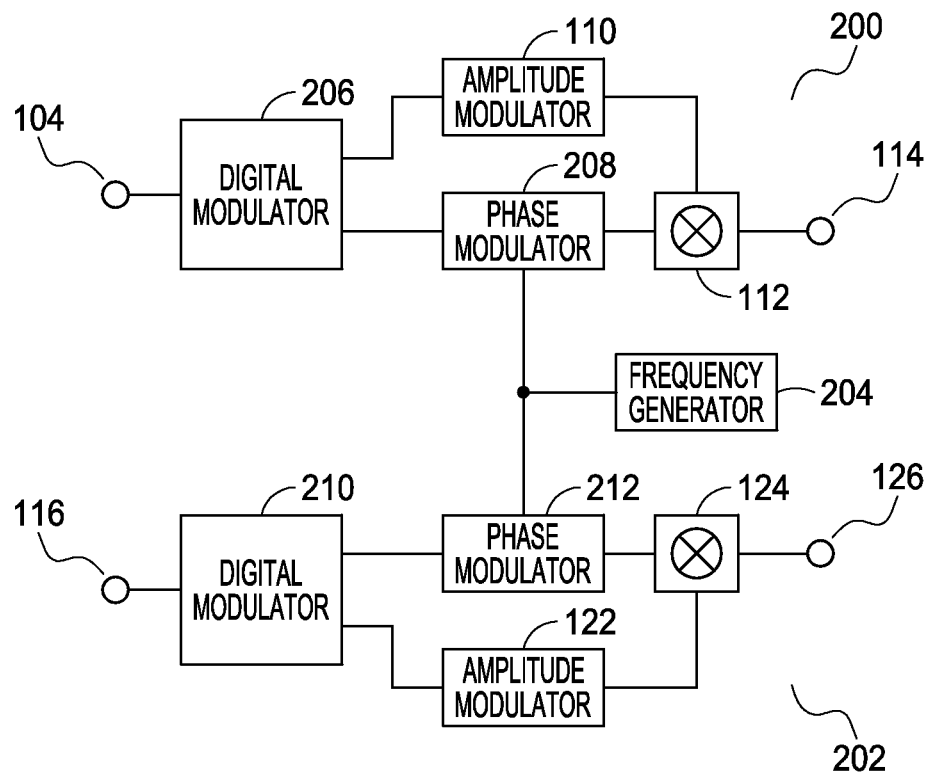
FIG. 2 shows a transmission arrangement having two parallel transmission paths and a common frequency generator.

FIG. 2 shows a transmission arrangement having a first transmission path 200 and a second transmission path 202. If the transmission arrangement in FIG. 2 has components with an identical configuration to the transmission arrangement in FIG. 1, the same reference symbols are selected. Such components are configured for an identical function and can be configured or developed in the same manner as the components in the transmission arrangement from FIG. 1.

The transmission arrangement illustrated differs from the transmission arrangement illustrated in FIG. 1 essentially in that it has a common frequency generator 204. Both the first transmission path 200 and the second transmission path 202 are each modulation paths for modulating a useful signal onto a carrier frequency signal generated by the common frequency generator 204.

The first transmission path 200 has a first input 104 via which a first useful signal is supplied. The first input 104 is connected to a first digital modulator 206. A first amplitude information signal and a first signal pair of Cartesian signals are generated from the first useful signal in the first digital modulator 206, the first signal pair comprising an in-phase signal and a quadrature signal. The first digital modulator 206 can also perform further functions, for example digital modulation of the useful data and/or pulse-shaping of the first amplitude information signal and of the first phase information signal.

The first digital modulator 206 is connected to a first phase modulator 208 and to a first amplitude modulator 110. In this case, the first digital modulator 206 supplies the first signal pair to the first phase modulator 208. The first signal pair comprises both the amplitude information and the phase information for the useful signal in the form of a Cartesian signal. The first phase modulator 208 modulates a carrier frequency signal with the signal pair to form a first modulated phase information signal. The first phase information signal is an intermediate signal which is then modulated with an item of amplitude information.

The first phase modulator 208 is connected to the frequency generator 204. The frequency generator 204 generates the carrier frequency signal and supplies the latter to the first phase modulator 208. The first phase modulator 208 is in the form of a Cartesian phase modulator.

The first digital modulator 206 supplies the first amplitude information signal to the first amplitude modulator 110. The first amplitude modulator 110 generates a first modulated amplitude information signal from the first amplitude information signal. The first amplitude modulator 110 is connected to the first input of a first mixing element 112. The first phase modulator 208 is connected to a second input of the first mixing element 112. The first mixing element 112 applies the first modulated amplitude information signal to the first modulated phase information signal. For this purpose, the first mixing element 112 may comprise a mixer or a multiplier. The first mixing element 112 provides, at a first signal output 114, a first output signal which now comprises modulation of the first useful signal onto a first carrier frequency signal.

The second transmission path 202 has a second input 116 via which the second useful signal is supplied. The second input 116 is connected to a second digital modulator 210. A second amplitude information signal and a second signal pair of Cartesian signals are generated from the second useful signal in the second digital modulator 210, the second signal pair comprising an in-phase signal and a quadrature signal. In this case, the second digital modulator 210 is configured in a similar manner to the first digital modulator 206 and performs the same functions as the first digital modulator 206.

The second digital modulator 210 is connected to a second phase modulator 212 and to an amplitude modulator 122. In this case, the second digital modulator 210 supplies the second signal pair to the second phase modulator 212. The second phase modulator 212 modulates the carrier frequency signal with the second signal pair to form a second modulated phase information signal. The second phase information signal is an intermediate signal which is then modulated with an item of amplitude information.

The second phase modulator 212 is connected to the frequency generator 204. The frequency generator 204 generates the carrier frequency signal and supplies the latter to the second phase modulator 212. The second phase modulator 212 is constructed in an identical manner to the first phase modulator 208.

The second digital modulator 210 supplies the second amplitude information signal to the second amplitude modulator 122. The second amplitude modulator 122 is constructed in an identical manner to the first amplitude modulator 110 and generates a second modulated amplitude information signal from the second amplitude information signal.

The second amplitude modulator 122 is connected to the first input of a second mixing element 124. The second phase modulator 212 is connected to a second input of the second mixing element 124. The second mixing element 124 applies the second modulated amplitude information signal to the second modulated phase information signal. It is constructed in an identical manner to the first mixing element 112. The second mixing element 124 provides, at a second signal output 126, a second output signal which now comprises modulation of the second useful signal onto a second carrier frequency signal.

In the transmission arrangement in FIG. 1, a frequency generator is provided in each phase modulator. As a result, crosstalk of the carrier frequency signal from one transmission path to the other may occur during operation. The transmission arrangement in FIG. 2 thus differs from the transmission arrangement in FIG. 1 in that a common frequency generator 204 is provided for the first signal path 200 and the second signal path 202. It is possible to use a common frequency generator 204 by providing Cartesian phase modulators 208 and 212 in the transmission paths. The signal generated by the phase modulators preferably has a constant envelope. The phase modulators therefore need not provide any particularly large linear, that is to say undistorted, operating range for signal processing. The amplitude modulation is carried out in the first transmission path 200 and in the second transmission path 202 by a separate circuit in the form of the first amplitude modulator 110 and the first amplitude modulator 122.

In addition to suppressing crosstalk and avoiding a possibly necessary frequency shift, the arrangement thus also has the advantage, in particular, that it has the properties of a polar modulator for signals with a low signal level. This is associated, inter alia, with a low energy requirement which is advantageous in mobile terminals and implementation in the form of a digital circuit which is cost-effective to produce.

Figure 3:
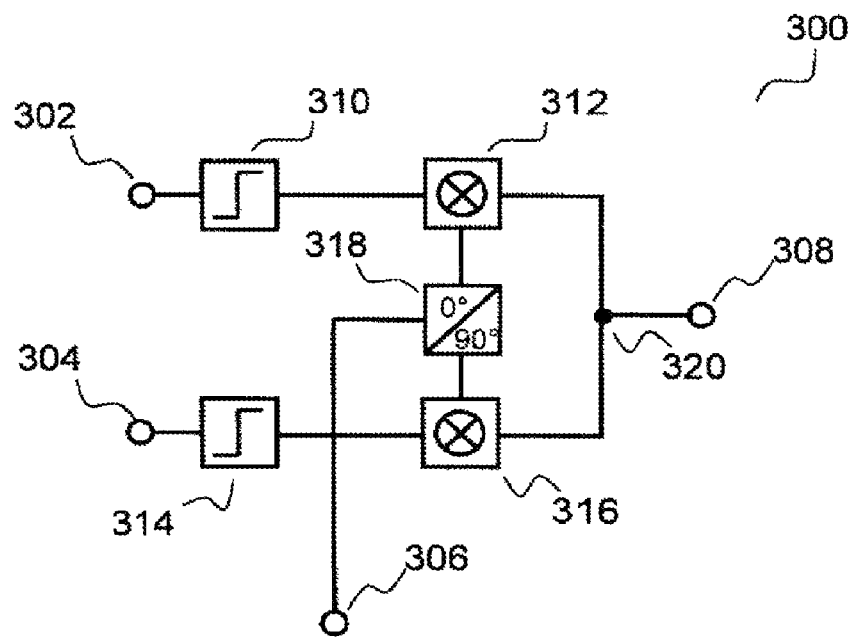
FIG. 3 shows one refinement of a Cartesian modulator for use in the transmission arrangement according to FIG. 2.

FIG. 3 shows one refinement of a Cartesian modulator 300 for use as a phase modulator 208 or 212 in the transmission arrangement according to FIG. 2. The modulator 300 has a first input 302 and a second input 304. Cartesian signals are supplied at the first input 302 and at the second input 304, that is to say an in-phase signal is supplied at the first input 302 and a quadrature signal is supplied at the second input 304. The signal pair can be provided by one of the digital modulators 206 and 210. The modulator 300 also has a third input 306 at which the modulator is supplied with a carrier frequency signal. The carrier frequency signal is provided by a frequency generator, for example the frequency generator 204. The modulator 300 has the function of modulating the Cartesian signals onto the carrier frequency signal. This generates a modulated phase information signal. The modulated phase information signal is provided at an output 308 of the modulator 300.

The first input 302 is connected to a first mixer 312 via a first limiter 310. The first limiter 310 limits the level of the supplied in-phase signal. A level-limited in-phase signal is thus supplied to the first mixer 312.

The second input 304 is connected to a second mixer 316 via a second limiter 314. The second limiter 314 limits the level of the supplied quadrature signal. A level-limited quadrature signal is thus supplied to the second mixer 316.

The third input 306 is connected to the first mixer 312 and to the second mixer 316 via a phase shifter 318. In this manner, the carrier frequency signal is fed into the first mixer 312 in a manner shifted by a constant phase of 0° and is fed into the second mixer 316 in a manner shifted by a constant phase of 90°. In the first mixer 312, the level-limited in-phase signal is mixed with the carrier frequency signal that has been shifted by the phase of 0°, and a first signal component of a modulated phase information signal is thus provided at a mixer output of the first mixer 312. In the second mixer 316, the level-limited quadrature signal is mixed with the carrier frequency signal that has been shifted by the phase of 90°, and a second signal component of a modulated phase information signal is thus provided at a mixer output of the second mixer 316.

The first mixer 312 and the second mixer 316 are each connected to a node 320 on the output side. The first signal component and the second signal component are added in the node 320 to form a modulated phase information signal. The modulated phase information signal is provided at the output 308.

The phase modulator 300 illustrated is thus set up to provide a modulated phase information signal having a constant envelope.

Figure 4:
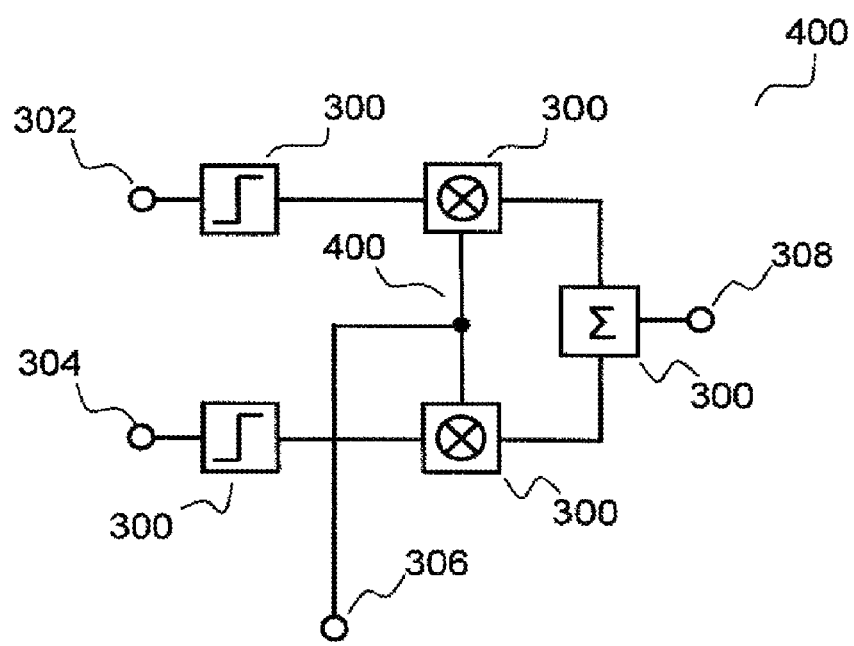
FIG. 4 shows another refinement of a Cartesian modulator for use in the transmission arrangement according to FIG. 2.

FIG. 4 shows another refinement of a Cartesian modulator for use in the transmission arrangement according to FIG. 2. If the Cartesian modulator shown in FIG. 4 has elements which have the same effect as the Cartesian modulator shown in FIG. 3, the same reference symbols are used.

The Cartesian modulator 400 according to the exemplary embodiment in FIG. 4 differs from the Cartesian modulator shown in FIG. 3 in that the phase shifter 318 has been replaced with a node 402. The third input 306 is directly connected to the first mixer 312 and to the second mixer 316, with the result that the carrier frequency signal is supplied to the two mixers with the same phase. The node 320 has been replaced with a summing element 404 in which the first signal component generated by the first mixer 312 is added, with the correct phase, to the signal component generated by the second mixer 316.

Figure 5:
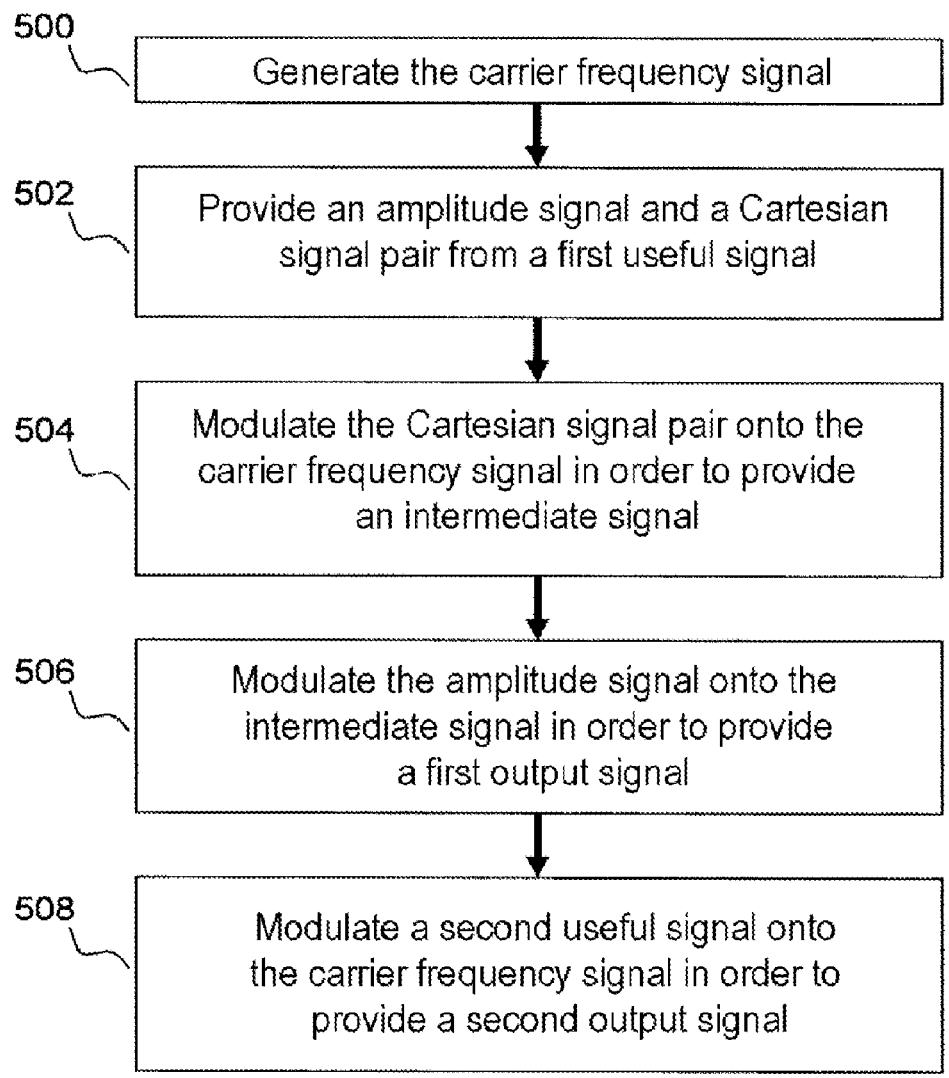
FIG. 5 shows an exemplary embodiment of a method for modulating useful signals onto a carrier frequency signal.

FIG. 5 shows an exemplary embodiment of a method for modulating useful signals onto a carrier frequency signal.

A carrier frequency signal is generated in a first step 500. An amplitude signal and a Cartesian signal pair are provided from the first useful signal in a second step 502. The Cartesian signal pair is modulated onto the carrier frequency signal in a third step 506 in order to provide an intermediate signal. The amplitude signal is modulated onto the intermediate signal in a fourth step 508 in order to provide a first output signal. A second useful signal is modulated onto the carrier frequency signal in a fifth step 510, which need not necessarily be carried out in sequence with the other steps 500 to 508, in order to provide a second output signal.

The invention claimed is:

1. A transmission arrangement for modulating useful signals onto a carrier frequency signal, having:
   a frequency generator for generating the carrier frequency signal;
   a first modulation path for modulating a first useful signal onto the carrier frequency signal; and
   a second modulation path for modulating a second useful signal onto the carrier frequency signal;
   wherein the frequency generator is common to the first and second modulation paths;
   the first modulation path having a digital modulator for providing an amplitude signal and a Cartesian signal pair from the first useful signal;
   the first modulation path having a first Cartesian modulator for modulating the Cartesian signal pair onto the carrier frequency signal in order to provide an intermediate signal;
   and the first modulation path being configured in such a manner that the amplitude signal is modulated onto the intermediate signal in order to provide a first output signal.

2. The transmission arrangement as claimed in patent claim 1,
   the second modulation path having a second digital modulator for providing a second amplitude signal and a second Cartesian signal pair from the second useful signal;
   the second modulation path having a second Cartesian modulator for modulating the second Cartesian signal pair onto the carrier frequency signal in order to provide a second intermediate signal;
   and the second modulation path being configured in such a manner that the second amplitude signal is modulated onto the second intermediate signal in order to provide a second output signal.

3. The transmission arrangement as claimed in patent claim 1, which is arranged in a semiconductor module.

4. The transmission arrangement as claimed in patent claim 1, the first useful signal and the second useful signal comprising the same information.

5. The transmission arrangement as claimed in patent claim 1, the first Cartesian modulator being set up to provide an intermediate signal having a constant envelope.

6. A method for modulating useful signals onto a carrier frequency signal, comprising:
   generating the carrier frequency signal, the carrier frequency common to a plurality of modulation paths;
   providing an amplitude signal and a Cartesian signal pair from a first useful signal;
   modulating the Cartesian signal pair onto the carrier frequency signal common to the plurality of modulation paths in order to provide an intermediate signal;
   modulating the amplitude signal onto the intermediate signal in order to provide a first output signal.

7. The method as claimed in patent claim 6, comprising:
   modulating a second useful signal onto the carrier frequency signal common to the plurality of modulation paths in order to provide a second output signal.

8. The method as claimed in patent claim 6, the first useful signal and the second useful signal comprising the same information.

9. The method as claimed in patent claim 6, the intermediate signal having a constant envelope being provided.

* * * * *

UNITED STATES PATENT AND TRADEMARK OFFICE
CERTIFICATE OF CORRECTION

PATENT NO. : 8,891,680 B2  
APPLICATION NO. : 12/830551  
DATED : November 18, 2014  
INVENTOR(S) : Adler et al.

Page 1 of 1

It is certified that error appears in the above-identified patent and that said Letters Patent is hereby corrected as shown below:

On the title page, item (65), in "Prior Publication Data", in column 1, line 1, after "2011",
insert --¶(30) Foreign Application Priority Data
July 7, 2009   (DE).............102009032049.0--, therefor Signed and Sealed this
Twenty-first Day of July, 2015

Michelle K. Lee
*Director of the United States Patent and Trademark Office*